United States Patent [19]
Gallant

[11] Patent Number: 4,635,897
[45] Date of Patent: Jan. 13, 1987

[54] TUBE FLOW SHUT-OFF DEVICE
[75] Inventor: Ben J. Gallant, Portland, Tex.
[73] Assignee: Airsonics License Partnership, Corpus Christi, Tex.
[21] Appl. No.: 717,585
[22] Filed: Mar. 29, 1985

Related U.S. Application Data
[63] Continuation of Ser. No. 537,932, Sep. 30, 1983, abandoned.

[51] Int. Cl.[4] ............................................. F16L 55/14
[52] U.S. Cl. ............................................. 251/5; 251/4; 251/7; 251/8; 137/375
[58] Field of Search ............ 251/4, 5, 6, 7, 8, 9, 251/10, 30; 137/375

[56] References Cited
U.S. PATENT DOCUMENTS

| 2,188,585 | 8/1938 | Hannay et al. | 251/7 |
| 2,588,212 | 3/1952 | Custer | 251/5 |
| 2,908,476 | 10/1959 | Hidding | 251/8 |
| 3,011,750 | 12/1961 | Johnson et al. | 251/5 |
| 3,353,560 | 11/1967 | McCulloch | 251/5 |
| 3,364,533 | 1/1968 | Sibraua | 251/5 |
| 3,490,732 | 1/1970 | Leroy | 251/5 |
| 3,882,899 | 5/1975 | Ginsberg et al. | 251/5 |
| 3,982,724 | 9/1976 | Citrin | 251/7 |
| 4,044,989 | 8/1977 | Basel et al. | 251/7 |
| 4,081,170 | 3/1978 | Dous, Jr. | 251/7 |
| 4,322,054 | 3/1982 | Campbell | 251/5 |
| 4,354,984 | 10/1982 | Richardson et al. | 251/7 |

FOREIGN PATENT DOCUMENTS

| 1960102 | 6/1971 | Fed. Rep. of Germany | 251/8 |
| 2439762 | 3/1975 | Fed. Rep. of Germany | 251/5 |
| 1347455 | 2/1963 | France | 251/8 |
| 693028 | 6/1953 | United Kingdom | 251/4 |
| 1058273 | 2/1967 | United Kingdom | 251/4 |
| 1569827 | 6/1980 | United Kingdom | 251/4 |
| 2042128 | 9/1980 | United Kingdom | 251/5 |
| 479919 | 8/1975 | U.S.S.R. | 251/4 |
| 496410 | 2/1976 | U.S.S.R. | 251/4 |

Primary Examiner—Samuel Scott
Assistant Examiner—H. A. Odar
Attorney, Agent, or Firm—Kenneth P. Synnestvedt

[57] ABSTRACT

A device is disclosed for effecting shut-off of flow through a tube formed of flexible material. The device includes a block having a bore through which the tube extends and having a resilient sleeve surrounding the tube in the bore and further including a plunger adapted to project through an aperture in the bore wall to engage the resilient sleeve and pinch the tube within the sleeve.

7 Claims, 4 Drawing Figures

U.S. Patent  Jan. 13, 1987  4,635,897
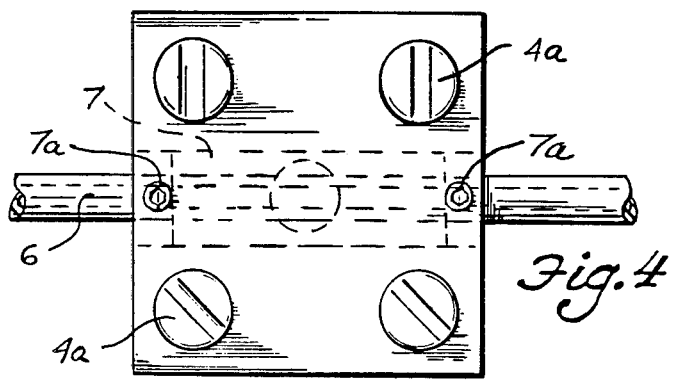
Fig. 4
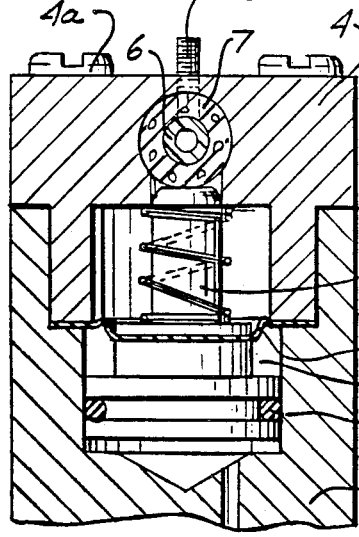
Fig. 3
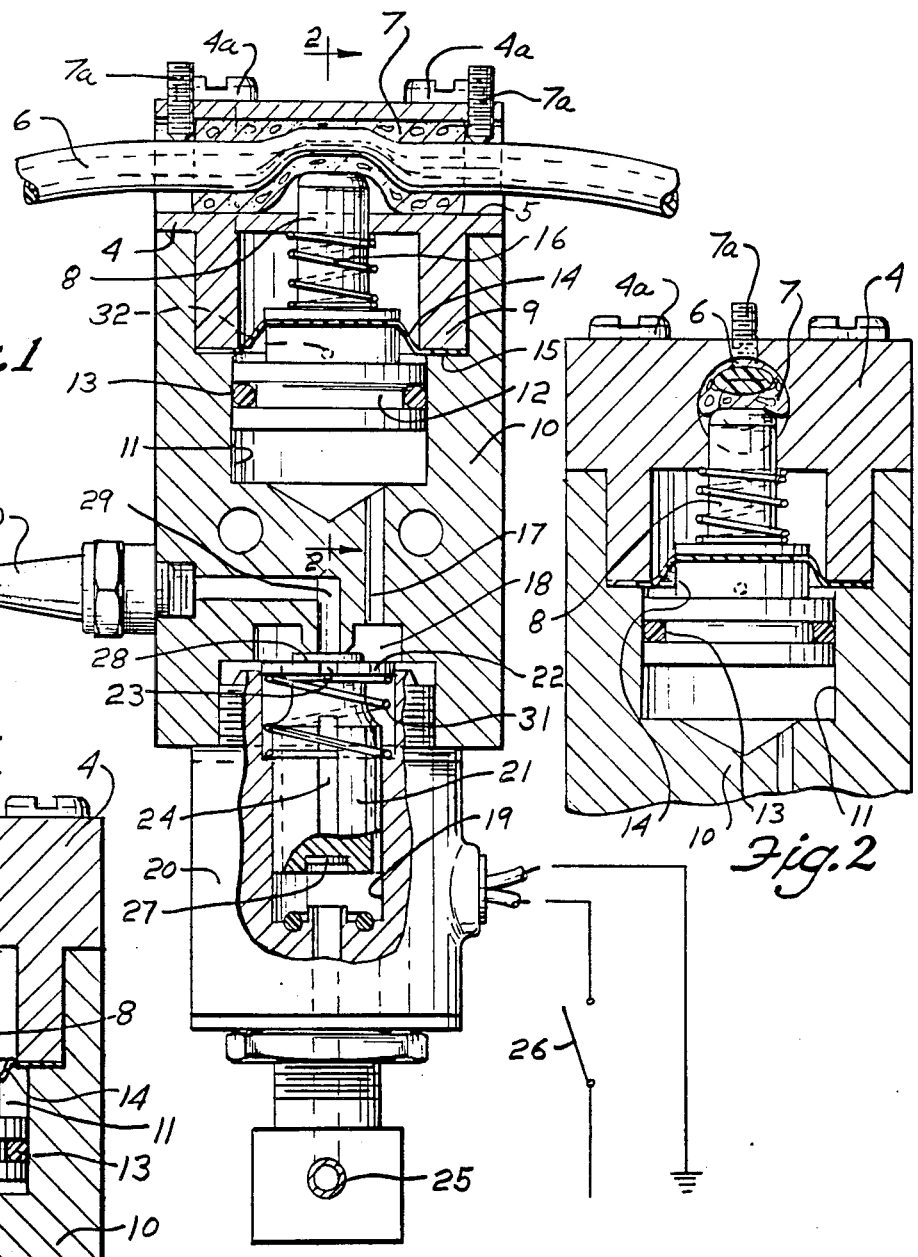
Fig. 1
Fig. 2

TUBE FLOW SHUT-OFF DEVICE

This is a continuation of co-pending application Ser. No. 537,932 filed on Sept. 30, 1983, now abandoned.

BACKGROUND AND STATEMENT OF OBJECTS

This invention relates to a flow shut-off device for a tube formed of flexible material and adapted to carry a fluid. Such devices are used for many different purposes, and while the device may be employed with tubes carrying liquids as well as gases, the device of the invention is especially adapted for use with tubes in which a gas, such as air, is carried. Still more specifically, such devices are of particular applicability to tubes carrying an air stream with suspended abrasive particles therein, such as used in machining operations, dental work and the like. For such abrasive purposes, the flow tube is repeatedly opened and closed in carrying out the desired abrasive operation.

In devices of the kind referred to, a relatively small diameter tube formed of flexible material, such as plastic materials, is commonly employed, and it has been known to effect shut-off of the flow by mechanically pinching the tube. With known prior art pinch shut-off devices, the tube has a tendency to deteriorate relatively rapidly.

The present invention provides an improved tube shut-off device, and it is a principal object of the present invention to provide a pinch tube shut-off type of device in which the life of the tube is greatly extended as compared with prior art arrangements, because of the manner in which the tube shut-off is effected.

BRIEF DESCRIPTION OF THE DRAWINGS

How the foregoing and other objects and advantages are attained will appear more fully from the following description of the drawings, in which:

FIG. 1 is a sectional view through a shut-off device constructed according to the present invention, illustrating the application of the device to a small diameter tube formed of flexible material, the device being illustrated in closed position in FIG. 1;

FIG. 2 is a transverse sectional view taken as indicated by the section line 2—2 on FIG. 1;

FIG. 3 is a view of the parts appearing in FIG. 2 but showing the shut-off device in open position; and FIG. 4 is a top plan view of the device shown in FIG. 1.

DETAILED DESCRIPTION OF THE DRAWINGS

The principal parts of the shut-off device for pinching the tube include a block 4 having a transverse bore 5 through which the tube 6 extends. In a typical case, the tube will be of a diameter of the order of 3/16", and it will be noted that the drawings are enlarged as compared with such a typical tube.

It will also be noted from the drawings that the bore 5 is of considerably larger diameter than the outside diameter of the tube. This relationship is provided in order to accommodate a sleeve 7 surrounding the tube where the tube passes through the bore 5 in the block 4. This sleeve may be retained in position by means of abutment screws 7a—7a. Preferably, the sleeve 7 is formed of highly resilient material, for instance, porous rubber or a porous synthetic plastic material, such as the material identified as Adaprene #2 and sold by the Dupont Company. It is also preferred that the diameter of the bore 5 be sufficiently great to accommodate a sleeve 7 of substantial thickness, and thereby provide for ready accommodation of the increase in the width of the tube 6 which occurs when the tube is pinched closed, as will be seen in FIG. 2. Preferably, the annular space around the tube within the bore is of sufficient dimension to accommodate a sleeve which is greater in thickness than the thickness of the tube 6. Preferably also, the thickness of the sleeve 7 is sufficient to substantially fill the annular space provided between the tube 6 and the wall of the bore 5.

Closure or pinching of the tube is effected by means of a plunger 8 which is mounted for shifting movement through an aperture in the side wall of the bore 5. The plunger is desirably of a diameter at least approximating the diameter of the tube 6.

In connection with the sleeve 7 surrounding the tube, as above indicated, that sleeve is preferably formed of a highly resilient material. The material used should be very readily deformable under the action of the shutoff plunger. Because of the character of the material of which the sleeve is formed, the sleeve does not appreciably inhibit shut-off of the tube 6, and this is of great importance for many purposes, including various applications in which the rapidity of shut-off is an important factor.

According to the invention, the plunger 8 may be actuated in any of a wide variety of ways and by means of a wide variety of control devices. In the particular embodiment illustrated, the plunger is arranged to be actuated by a device briefly described hereinafter but which is already known for use with other types of tube shut-off arrangements.

In considering the manner of operation of the plunger 8, it is first noted that the block 4, when viewed as in FIG. 1, is provided with a downwardly projecting mounting cylinder 9 which is received in a cavity at the upper end of the base 10. As seen in FIGS. 1 and 4, the corner portions of the block 4 are secured to the base 10 by means of screws as indicated at 4a. The base 10 has a central cavity or cylinder 11 in which a piston 12 is adapted to move vertically, the piston having an annular gasket or sealing ring 13 engaging the wall of the cylinder 11. Toward its upper end, the piston 12 cooperates with a flexible diaphragm 14 bridging the piston area and having its margin 15 pinched between the base 10 and the lower edge of the cylindrical part 9 of the block 4.

The pinch plunger 8 is connected with the piston 12 and moves upwardly and downwardly with the piston. A helical spring 16 urges the piston and plunger downwardly when the pressure below the piston is released. The cylinder 11 has a fluid pressure connection 17 extended downwardly in the base 10 to the chamber 18 which communicates with a chamber 19 formed within the solenoid 20. Vertically reciprocable within the chamber 19 is a piston device generally indicated at 21. This device has an upper radial projection or flange 22 having peripheral notches 23 which cooperate in providing communication from the chamber 18 past the flange 22 to longitudinal grooves 24, the lower ends of which communicate with the lower part of chamber 19.

In the lower portion of the actuating mechanism, a fluid pressure supply line 25 is provided, being connected at its upper end with the lower end of the chamber 19. With the parts in the positions illustrated in FIG.

1, the pressure of the operating fluid (for instance compressed air) entering through the connection 25 will flow upwardly into the chamber 19 and upwardly through the passages 24 and 23 into the chamber 18 and then through the connection 17 into the cylinder 11 below the piston 12. This pressure will, therefore, maintain the plunger 8 in its upper position which is shown in FIG. 1 in which the tube is shut off.

When the solenoid 20 is actuated, for instance, by the manually controllable switch diagrammatically indicated at 26, the piston 21, which serves as a solenoid armature, is drawn downwardly, thereby bringing the rubber valve element 27 against the upper end of the pressure inlet 25, thereby shutting off the communication with the supply pressure. At the same time, the valve element 28 at the top of the piston 21 moves downwardly and opens the chamber 18 to the exhaust connection 29, thereby permitting the pressure in the cylinder 11 to be released downwardly through the passage 17, the chamber 18 and the exhaust connection 29 for release to atmosphere. The connection 29 may conveniently have an associated porous discharge closure 30 adapted to prevent ingress of dirt but permit the pressure release.

The spring 31 serves to maintain the valve element 28 against the exhaust port 29 except when the solenoid control switch 26 is closed, thereby drawing the piston 21 downwardly, with resultant opening of the exhaust port and release of the pressure in the cylinder 11. At this time, the spring 16 will move the plunger 8 downwardly and thereby cause the flow tube to open.

A vent 32 is provided in the wall of the base 10 communicating with the space below the diaphragm 14 in order to facilitate free motion of the plunger 8 upwardly and downwardly according to the control condition.

It is to be understood that the solenoid-actuating mechanism forms no part of the present invention per se but is illustrative of one form of actuating equipment with which the pinch tube shut-off device of the present invention may be used.

In connection with the action of the plunger 8 in effecting the shut-off of the tube, several dimensional interrelationships hereinabove referred to are of importance. As seen in FIG. 2, the tube 6 is pinched closed and, therefore, has a dimension transverse to the axis of the plunger 8 which is greater than the dimension of the tube when it is not pinched. The dimension of the resilient sleeve 7 should, therefore, be great enough to accommodate this widening of the tube when the tube is pinched.

The pinching action is also facilitated and enhanced by virtue of employing a sleeve 7 of quite highly resilient material, and the bore 5 should be large enough in relation to the diameter of the tube to accommodate a sleeve 7 of greate thickness than the thickness of the wall of the tube 6.

The width or diameter of the plunger 8 and the corresponding dimension of the aperture provided in the wall of the bore is preferably at least as great as the diameter of the unpinched tube 6, but not as great as the diameter of the bore itself. The plunger is preferably formed or coated with a material having a relatively low coefficient of friction, for instance, nylon or teflon.

The pinch shut-off device of the invention may be employed with flexible tubes of various sizes, for instance, tubes of diameters up to about one inch. In order to provide for effective collapse or pinching of the larger tubes, the resilient sleeve employed should be correspondingly increased in diameter, and preferably also, in thickness.

The arrangement of the invention provides effective pinch type of tube closure, while greatly reducing tube wear. It is also of importance that in Applicant's arrangement, the tube may be longitudinally shifted in the resilient sleeve, thereby alternatively bringing different portions of the tube into the pinching zone, and the sleeve and the tube are relatively shiftable in the axial direction to bring different portions of the tube into registry with the plunger as will readily be understood from examination of the drawings. The freedom for these relative adjustment movements of the tube, sleeve and pinching plunger greatly extends the life of both the tube and the sleeve.

I claim:

1. A flow shut-off device for a tube formed of collapsible flexible material, comprising a black having a transverse bore through which said flexible tube continuously extends with portions projecting beyond the ends of the bore, the bore being defined by a wall in the block and the block having an aperture extended through the bore wall at one side of said bore, a sleeve of resilient material surrounding the tube in said bore and extending across said aperture, said block, sleeve and tube being relatively shiftably moveable axially of the tube, and a reciprocable plunger mounted for shifting movement through said aperture transversely of the tube and of the surrounding sleeve and providing for closure of the tube by transversely compressing said sleeve and thereby transversely collapsing said tube within said sleeve.

2. A flow shut-off device as in claim 1 in which the bore in the block is of substantially greater diameter than the tube to provide an annular chamber surrounding the tube, the wall thickness of said sleeve being sufficient to substantially fill said annular chamber.

3. A flow shut-off device as in claim 2 in which said sleeve is formed of a resilient porous material and has a greater wall thickness than said tube.

4. A flow shut-off device as in claim 3 in which the plunger has a rounded end positioned to contact the sleeve, said rounded end having a diameter substantially the same as the diameter of the tube, and substantially smaller than the diameter of the sleeve.

5. A flow shut-off device as in claim 1 further comprising abutment means for retaining the sleeve in a predetermined position in the bore, the abutment means projecting through a side of the block and being retractable to provide freedom for axial shifting movement of the sleeve with respect to the block.

6. A flow shut-off device as in claim 1 wherein the reciprocable plunger is mounted for shifting movement between a flow-shut position wherein the plunger resiliently compresses said sleeve and said tube therewithin to collapse the tube, and a flow-open position wherein said plunger is shifted away from said bore thus providing for opening of the tube.

7. A flow shut-off device for use with a tube formed of collapsible flexible material, comprising a block having a transverse bore through which said flexible tube continuously extends with portions projecting beyond the ends of the bore, the bore having a bore wall in the block and the block having an aperture through the bore wall, a sleeve of resilient material surrounding the tube in said bore and extending across said aperture, and a reciprocable plunger mounted for shifting movement through said aperture transversely of the tube and of the surrounding sleeve and providing for closure of the tube by transversely compressing said sleeve and thus transversely collapsing said tube, the block and the tube being relatively shiftably moveable axially of the tube to bring different portions of the tube into registry with the plunger.

* * * * *